United States Patent
Conis (10) Patent No.: US 10,612,486 B2
(45) Date of Patent: Apr. 7, 2020

(54) SYSTEMS AND METHODS FOR IDENTIFYING A STUCK OPEN EXHAUST GAS RECIRCULATION VALVE

(71) Applicant: Ford Global Technologies, LLC, Dearborn, MI (US)

(72) Inventor: Peter Conis, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 15/664,892

(22) Filed: Jul. 31, 2017

(65) Prior Publication Data

US 2019/0032590 A1 Jan. 31, 2019

(51) Int. Cl.

| F02D 41/22 | (2006.01) |
|---|---|
| F02M 26/49 | (2016.01) |
| F02M 26/54 | (2016.01) |
| F02P 5/04 | (2006.01) |
| F02D 41/26 | (2006.01) |
| F02D 41/00 | (2006.01) |
| F02D 41/04 | (2006.01) |
| F02N 11/08 | (2006.01) |
| F02M 26/47 | (2016.01) |

(Continued)

(52) U.S. Cl.
CPC .......... *F02D 41/221* (2013.01); *B60W 10/06* (2013.01); *B60W 10/08* (2013.01); *B60W 20/40* (2013.01); *F02D 41/0077* (2013.01); *F02D 41/042* (2013.01); *F02D 41/26* (2013.01); *F02M 26/47* (2016.02); *F02M 26/49* (2016.02); *F02M 26/54* (2016.02); *F02N 11/08* (2013.01); *F02P 5/045* (2013.01); *B60W 2510/244* (2013.01); *B60W 2710/0605* (2013.01); *B60W 2710/08* (2013.01); *F02D 41/0055* (2013.01); *F02D 41/1448* (2013.01); *F02D 2200/0406* (2013.01); *F02D 2200/101* (2013.01); *F02D 2200/1002* (2013.01); *F02D 2250/24* (2013.01); *F02N 11/0829* (2013.01); *F02P 5/1516* (2013.01); *Y10S 903/903* (2013.01)

(58) Field of Classification Search
CPC .. F02D 41/0055; F02D 41/26; F02D 41/0087; F02D 41/065; F02D 13/06; F02D 2200/70; F02D 41/042; B60W 10/06; B60W 20/50; B60W 2510/068; B60W 2550/12; B60W 2710/0644; B60W 2510/244; F02M 35/10393; F02M 35/104
USPC .......................................................... 701/22
See application file for complete search history.

(56) References Cited

U.S. PATENT DOCUMENTS

| 5,508,926 A | 4/1996 | Wade |
|---|---|---|
| 6,763,708 B2 | 7/2004 | Ting et al. |

(Continued)

*Primary Examiner* — Muhammad Shafi
(74) *Attorney, Agent, or Firm* — Geoffrey Brumbaugh; McCoy Russell LLP (57) ABSTRACT

Methods and systems are provided for determining whether an exhaust gas recirculation (EGR) valve is degraded and being held open in a vehicle system. In one example, a method may include, in response to an engine pull-down request, closing a throttle coupled to an intake manifold of the engine, closing the EGR valve, propelling the vehicle via an electric motor, and checking operation of the EGR valve based on both intake manifold pressure and exhaust pressure. For example, if the intake manifold pressure does not decrease by a threshold amount relative to the exhaust pressure, EGR valve degradation may be indicated.

18 Claims, 4 Drawing Sheets

(51) Int. Cl.
*B60W 20/40* (2016.01)
*B60W 10/06* (2006.01)
*B60W 10/08* (2006.01)
*F02D 41/14* (2006.01)
*F02P 5/15* (2006.01)

(56) References Cited

U.S. PATENT DOCUMENTS

| | | |
|---|---|---|
| 8,131,682 B2 | 3/2012 | Kitamura |
| 2008/0066699 A1* | 3/2008 | Michelini ........... F02D 13/0253 123/90.11 |
| 2010/0280739 A1* | 11/2010 | Rollinger ................. F01L 1/34 701/102 |
| 2014/0102428 A1* | 4/2014 | Fulton ................. F02B 29/0468 123/568.12 |
| 2014/0350823 A1* | 11/2014 | Glugla .................... F02P 5/152 701/104 |
| 2016/0115884 A1* | 4/2016 | VanDerWege ...... F02D 41/0087 123/481 |
| 2016/0137030 A1* | 5/2016 | Leone ..................... F01P 7/165 237/5 |
| 2016/0169170 A1* | 6/2016 | Russ .................... F02B 37/162 60/599 |

* cited by examiner

SYSTEMS AND METHODS FOR IDENTIFYING A STUCK OPEN EXHAUST GAS RECIRCULATION VALVE

FIELD

The present description relates generally to methods and systems for controlling a vehicle engine to diagnose a valve controlling a flow of recirculating exhaust gas.

BACKGROUND/SUMMARY

Vehicle engine systems may utilize an external exhaust gas recirculation (EGR) system to reduce $NO_x$ emissions and increase engine efficiency. For example, the external EGR system may couple an engine exhaust manifold to an engine intake manifold via an EGR passage. An EGR valve disposed within the EGR passage may be controlled to achieve a desired intake air dilution for the given engine operating conditions (e.g., engine speed, engine load, and engine temperature) to maintain desirable combustion stability while providing emissions and fuel economy benefits. Degradation of the EGR system may degrade engine performance, for example, by increasing emissions or reducing fuel economy. For example, if the EGR valve becomes degraded and stuck open, such as due to carbon deposits blocking valve closure, EGR may be delivered when no EGR is desired. This may lead to rough idle, stalling, and an increased occurrence of misfire. Therefore, various diagnostic procedures may be periodically or opportunistically performed to monitor operation of the EGR system, including the EGR valve.

Other attempts to identify degradation of the EGR system include performing a diagnostic routine while the vehicle is operating in a coastdown mode, while an accelerator pedal is not depressed and the vehicle is moving. One example approach is shown by Whitney et al. in U.S. Pat. No. 8,316,828. Therein, when the vehicle is in the coastdown mode, the EGR valve is opened while a throttle area is maintained. An error of the EGR system is selectively diagnosed based on a pressure increase measured in an intake manifold of the vehicle when the EGR valve is opened, such as when the measured pressure increase is less than a minimum pressure increase.

However, the inventor herein has recognized that hybrid vehicles and stop/start vehicles, in which the engine is shut off (e.g., pulled down) while the vehicle is in motion, provide an additional opportunity to check whether the EGR valve is stuck open, such as due to an obstruction preventing the valve from fully closing. This may be particularly beneficial because hybrid vehicles commonly include an open-loop stepper motor for adjusting EGR valve position, and thus, there is no direct feedback on the EGR valve position. Because the engine pull-down occurs as a part of hybrid and stop/start vehicle operation, no additional throttle position and EGR valve position adjustments are needed, and monitoring the EGR valve during the engine pull-down is non-intrusive.

In one example, the issues described above may be addressed by a method, comprising: propelling a vehicle by an engine having a throttle coupled to an intake manifold; recirculating a portion of engine exhaust to the intake manifold through an exhaust gas recirculation (EGR) valve; and checking operation of the EGR valve, based on both intake manifold pressure and exhaust pressure, after closing the throttle and the EGR valve when propelling the vehicle with an electric motor while the engine spins down to rest. In this way, an EGR valve that is stuck open, enabling undesired recirculation of exhaust gas, may be identified.

As one example, checking operation of the EGR valve may include comparing the intake manifold pressure to the exhaust pressure, such as a difference or a ratio of the intake manifold pressure and the exhaust pressure, while the engine spins down to rest. It may be indicated that the EGR valve is degraded and stuck open in response to the difference not reaching or exceeding a threshold difference or in response to the ratio not reaching or decreasing below a threshold ratio. In this way, the EGR valve may be identified as stuck open without a position sensor and without altering throttle and EGR valve control. Further, engine operating parameters may be adjusted in order to compensate for undesired EGR flow, such as by advancing spark timing and decreasing fueling. Thereby, emissions and degraded engine performance, such as due to misfire, rough idle, and stalling, may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
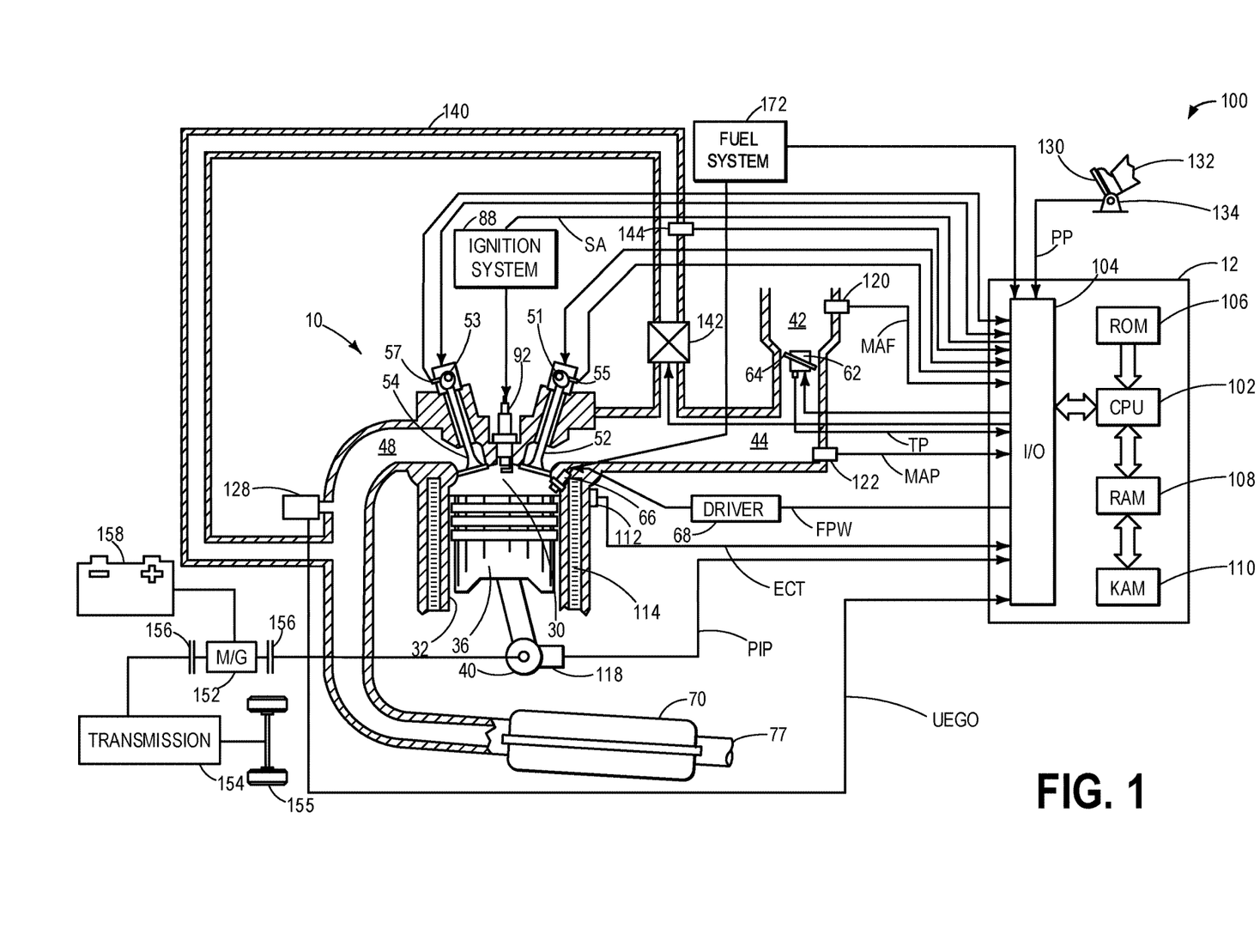
FIG. 1 shows a schematic depiction of an example vehicle system.

The following description relates to systems and methods for checking operation of an exhaust gas recirculation (EGR) valve during engine pull-down in a hybrid or stop/start vehicle system, such as the hybrid vehicle shown in FIG. 1. The EGR valve may be diagnosed based on an intake pressure relative to an exhaust pressure after the EGR valve and a throttle are closed during engine pull-down, such as according to the example method of FIG. 2. If the EGR valve is determined to be degraded and stuck open, adjustments may be made to engine operating parameters, including ignition timing and fueling, in order to compensate for undesired EGR flow through the at least partially open valve, such as according to the example method of FIG. 3. A prophetic example timeline of determining whether the EGR valve is stuck open based on an intake and exhaust pressure relation during hybrid engine pull-down is shown in FIG. 4.

FIG. 1 illustrates a schematic diagram of a vehicle system 100 showing one cylinder of a multi-cylinder engine 10, which may be included in a propulsion system of a vehicle. Engine 10 may be controlled at least partially by a control system, including a controller 12, and by input from a vehicle operator 132 via an input device 130. In this example, input device 130 includes an accelerator pedal and a pedal position sensor 134 for generating a proportional pedal position signal PP. A combustion chamber (e.g., cylinder) 30 of engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of the vehicle via an intermediate transmission system 154. Further, a starter motor may be coupled to crankshaft 40 via a flywheel to enable a starting operation of engine 10.

Combustion chamber 30 and the rest of the cylinders of engine 10 may receive intake air from an intake manifold 44 via an intake passage 42 and may exhaust combustion gases via an exhaust passage 48. Intake manifold 44 and exhaust passage 48 can selectively communicate with combustion chamber 30 via an intake valve 52 and an exhaust valve 54, respectively. In some embodiments, combustion chamber 30 may include two or more intake valves and/or two or more exhaust valves. In this example, intake valve 52 may be controlled by controller 12 by cam actuation via a cam actuation system 51. Similarly, exhaust valve 54 may be controlled by controller 12 via a cam actuation system 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by valve position sensors (not shown) and/or camshaft position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation, including CPS and/or VCT systems. In still other embodiments, the intake and exhaust valves may be controlled by a common valve actuator or actuation system or a variable valve timing actuator or actuation system.

In some embodiments, each cylinder of engine 10 may include a spark plug 92 for initiating combustion. An ignition system 88 can provide an ignition spark to combustion chamber 30 via spark plug 92 in response to a spark advance signal SA from controller 12, under select operating modes. Although spark ignition components are shown, in some embodiments, combustion chamber 30 or one or more other combustion chambers of engine 10 may be operated in a compression ignition mode, with or without an ignition spark.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to combustion chamber 30 for injecting fuel directly therein in proportion to the pulse width of a signal FPW received from controller 12 via an electronic driver 68. In this manner, fuel injector 66 provides what is known as direct injection (hereafter also referred to as "DI") of fuel into combustion chamber 30. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In an alternate embodiment, injector 66 may be a port injector providing fuel into the intake port upstream of cylinder 30.

Fuel may be delivered to fuel injector 66 from a high pressure fuel system 172 including fuel tanks, fuel pumps, and a fuel rail. Alternatively, fuel may be delivered by a single stage fuel pump at a lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 172 may hold fuel with different fuel qualities, such as different fuel compositions. These differences may include different alcohol content, different octane, different heat of vaporizations, different fuel blends, and/or combinations thereof, etc.

Continuing with FIG. 1, intake passage 42 may include a throttle 62 having a throttle plate 64 and a throttle position sensor. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30, among other engine cylinders. The position of throttle plate 64 may be provided to controller 12 by the throttle position sensor via a throttle position signal TP. Intake passage 42 may include a mass air flow (MAF) sensor 120 and a manifold absolute pressure (MAP) sensor 122 for providing respective signals MAF and MAP to controller 12.

An exhaust gas sensor 128 is shown coupled to exhaust passage 48 upstream of an emission control device 70. Upstream exhaust gas sensor 128 may be any suitable sensor for providing an indication of exhaust gas air-fuel ratio, such as a linear wideband oxygen sensor or UEGO (universal or wide-range exhaust gas oxygen), a two-state narrowband oxygen sensor or EGO, a HEGO (heated EGO), a $NO_x$ sensor, an HC sensor, or a CO sensor. In the example of FIG. 1, exhaust gas sensor 128 is shown as a UEGO sensor, configured to output a voltage signal UEGO to controller 12 corresponding to an amount of oxygen in the exhaust gas. Controller 12 may use the output to determine the exhaust gas air-fuel ratio (AFR).

Emission control device 70 is shown arranged along exhaust passage 48 downstream of exhaust gas sensor 128. Emission control device 70 may be a three-way catalyst (TWC) configured to reduce $NO_x$ and oxidize CO and unburnt hydrocarbons. In some embodiments, emission control device 70 may be a lean $NO_x$ trap, a particulate filter, various other emission control devices, or combinations thereof. In some examples, one or more additional emission control devices may be coupled to exhaust passage 48. Further, in some examples, one or more additional exhaust gas sensors may be coupled to exhaust passage 48 downstream of emission control device 70 to indicate an AFR of the exhaust gas after passing through emission control device 70 and before exiting to the atmosphere through tailpipe 77.

As shown in FIG. 1, vehicle system 100 may include an external exhaust gas recirculation (EGR) system to route a desired portion of exhaust gas from exhaust passage 48 to intake manifold 44 via an EGR passage 140. The amount of EGR provided to intake manifold 44 may be varied by adjusting a position of an EGR valve 142 disposed within EGR passage 140. For example, controller 12 may be configured to actuate and adjust a position of EGR valve 142 in order to control an amount of EGR flow through EGR passage 140. In the example of FIG. 1, EGR valve 142 is positioned by an incorporated stepper motor. The stepper motor is actuated by controller 12 to adjust the position of EGR valve 142 through a range of discreet steps (e.g., 52 steps), for example. However, in other examples, EGR valve 142 may be a vacuum actuated valve, an electronically activated solenoid valve, or other type of flow control valve. When EGR valve 142 is in a closed position, no exhaust gases may flow from exhaust passage 48 to intake manifold 44. When EGR valve 142 is in an open position, exhaust gases may flow from exhaust passage 48 to intake manifold 44 via EGR passage 140. Controller 12 may additionally adjust EGR valve 142 into a plurality of positions between fully open and fully closed. As the opening of EGR valve 142 is increased, the amount of EGR provided to intake manifold 44 increases, and as the opening of EGR valve 142 is decreased, the amount of EGR provided to intake manifold 44 decreases.

Under some conditions, the EGR system may be used to regulate the temperature of the air and fuel mixture within the combustion chamber. Further, EGR may be desired to attain a desired engine dilution, thereby improving fuel efficiency and emissions quality, in particular, emissions of nitrogen oxides. For example, EGR may be requested at low to mid engine loads. Additionally, EGR may be desired after emission control device 70 has attained its light-off temperature. An amount of EGR requested may be based on engine operating conditions, including engine load (as estimated via pedal position sensor 134), engine speed (as estimated via a crankshaft acceleration sensor), engine temperature (as estimated via an engine coolant temperature sensor 112), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor) as the output.

However, EGR may flow through EGR passage 140 even when EGR supply is not commanded (e.g., EGR valve 142 is commanded closed) due to EGR valve degradation, such as when the EGR valve is stuck in an open position. For example, debris may prevent EGR valve 142 from closing completely. However, EGR valve 142 may not include a sensor for directly measuring the position of the valve. Instead, the stepper motor may be controlled in an open-loop fashion, in which the position of the EGR valve is adjusted based on EGR demand and not using feedback from a position sensor. Additionally or alternatively, the EGR valve position may be inferred, as described further below.

A sensor 144 may be arranged within EGR passage 140 and may provide an indication of one or more of pressure, temperature, and concentration of the exhaust gas. In the example of FIG. 1, sensor 144 is an absolute pressure sensor configured to output a signal to controller 12 corresponding to a pressure of the exhaust gas (e.g., an exhaust pressure signal). In some examples, the exhaust pressure signal and the MAP signal (e.g., as output by MAP sensor 122 of FIG. 1) may be used to determine EGR valve degradation, such as when EGR valve 142 is stuck open, during engine pull-down, as further described below with respect to FIG. 2.

Controller 12 is shown in FIG. 1 as a microcomputer, including a microprocessor unit 102, input/output ports 104, an electronic storage medium for executable programs and calibration values shown as read-only memory chip 106 in this particular example, random access memory 108, keep alive memory 110, and a data bus. Storage medium read-only memory 106 can be programmed with computer readable data representing non-transitory instructions executable by processor 102 for performing the methods described below, such as the method described with respect to FIG. 2, as well as other variants that are anticipated but not specifically listed.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to a cooling sleeve 114; a profile ignition pickup signal (PIP) from a Hall effect sensor 118 (or other type) coupled to crankshaft 40; throttle position (TP) from the throttle position sensor; and absolute manifold pressure (MAP) signal from MAP sensor 122. Engine speed, RPM, may be generated by controller 12 from signal PIP. Controller 12 receives signals from the various sensors of FIG. 1 and employs the various actuators of FIG. 1, such as EGR valve 142 and fuel injector 66, to adjust engine operation based on the received signals and instructions stored on a memory of the controller. For example, adjusting a position of EGR valve 142 may include sending a signal to the stepper motor of EGR valve 142 to adjust the EGR valve position (e.g., an opening of EGR valve 142).

In some examples, vehicle system 100 may be a hybrid vehicle with multiple sources of torque available to one or more vehicle wheels. For example, vehicle system 100 may include engine 10 and an electric machine 152, which may be a motor or a motor/generator. In other examples, vehicle 100 is a conventional vehicle with only an engine. In the example shown, vehicle system 100 includes engine 10 and electric machine 152. Crankshaft 40 of engine 10 and electric machine 152 are connected via transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 40 from transmission 154 and the components connected thereto, and/or connect or disconnect electric machine 152 from transmission 154 and the components connected thereto. Transmission 154 may be a gearbox, a planetary gear system, or another type of transmission. The powertrain may be configured in various manners, including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

As described above, FIG. 1 shows only one cylinder of a multi-cylinder engine, and each cylinder may similarly include its own set of intake/exhaust valves, fuel injector, spark plug, etc.

As mentioned above, an EGR system may recirculate a portion of exhaust gas to an intake manifold of an engine in order to provide a desired engine dilution. Recirculated exhaust gas may increase fuel economy and reduce emissions, for example. However, when the EGR system is degraded due to a stuck open EGR valve, engine performance may be degraded. For example, by supplying EGR when EGR is not requested through the stuck open EGR valve, the engine may exhibit rough idle and an increased occurrence of misfire. Furthermore, peak engine power may be reduced. Therefore, it may be beneficial to periodically or opportunistically check operation of the EGR system, including the EGR valve, in particular when the EGR valve is positioned to a stepper motor and not coupled to a position sensor for feedback concerning the position of the valve.

Figure 2:
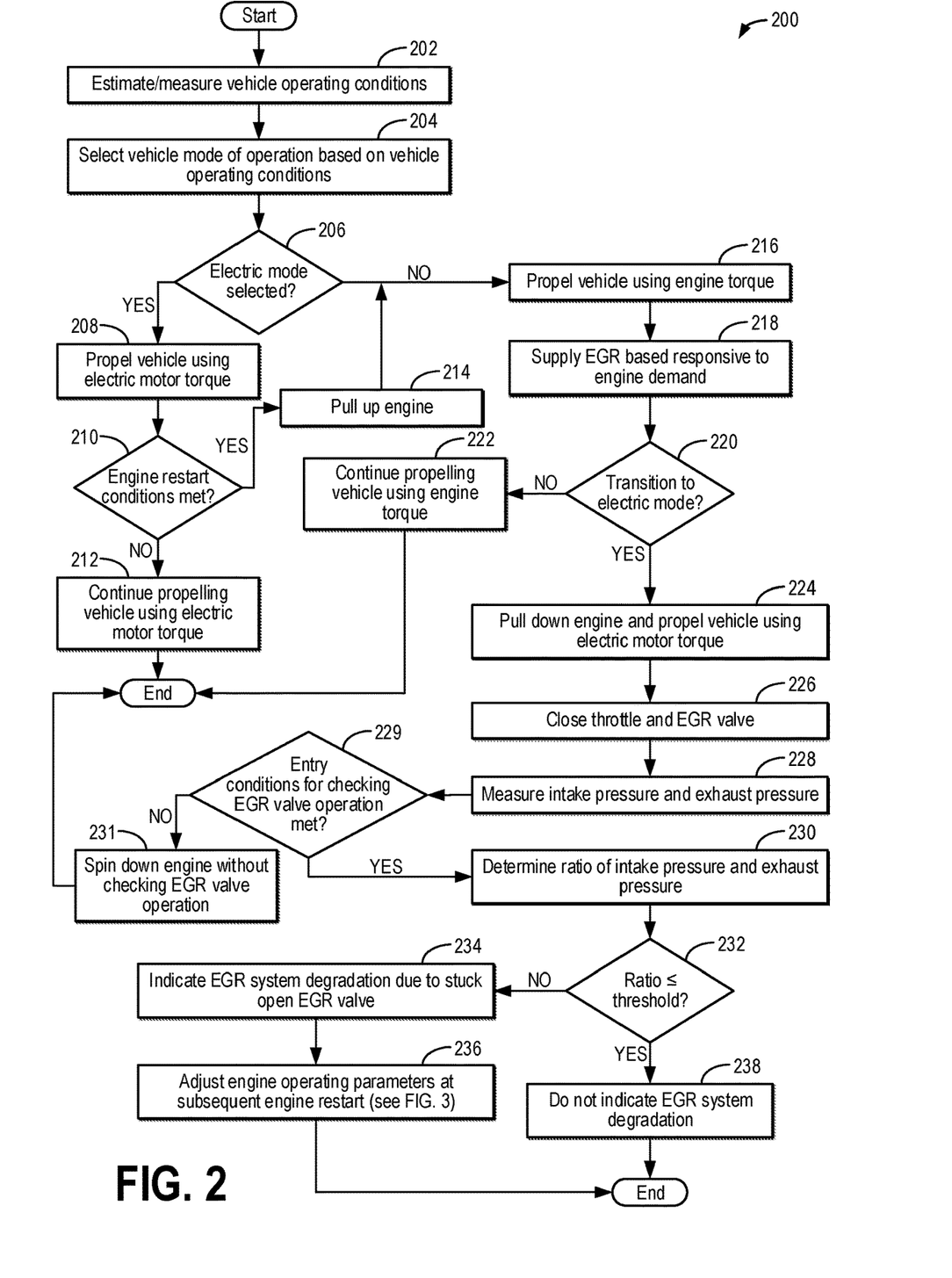
FIG. 2 is a high-level flow chart of an example method for checking whether an exhaust gas recirculation (EGR) valve is stuck open during an engine pull-down.

FIG. 2 provides an example method 200 for checking operation of an EGR valve (e.g., EGR valve 142 of FIG. 1) included in an EGR system in a vehicle (e.g., vehicle 5 shown in FIG. 1). The vehicle may be a hybrid vehicle or a stop/start vehicle, wherein an engine pull-down event, in which the engine is shut down while the vehicle remains in motion, provides an opportunity for determining if the EGR valve is degraded and stuck open. As such, method 200 is a non-intrusive diagnostic routine. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., pressure sensor 144). The controller may employ engine actuators of the engine system to adjust engine operation according to the methods described below.

Method 200 begins at 202 and includes estimating and/or measuring vehicle operating conditions. These may include, for example, driver torque demand (such as based on output of a pedal position sensor coupled to an operator pedal); vehicle speed; engine speed; ambient temperature, pressure and humidity; engine temperature, state of charge of an energy storage device (such as traction battery 158 of FIG. 1), fuel level in a fuel tank, fuel octane of available fuel(s), etc. In addition, engine operating conditions such as intake pressure (MAP), manifold air flow (MAF), exhaust pressure, engine temperature, catalyst temperature, intake temperature, knock limits, etc., may be estimated and/or measured. In one example, intake pressure may be measured using a manifold absolute pressure sensor, such as MAP sensor 122 of FIG. 1. In another example, intake pressure may be estimated using an algorithm or map based on engine speed and load, wherein the engine speed and load are input into the algorithm or map and the corresponding intake pressure value is output.

At 204, method 200 includes selecting a vehicle mode based on the vehicle operating conditions (e.g., as estimated/measured at 202). For example, an electric mode of operation may be selected when the torque demand is lower (e.g., lower than a first torque threshold), when the fuel level in the fuel tank is lower (e.g., lower than a fuel level threshold), and/or when the battery state of charge (SOC) is higher (e.g., higher than a threshold SOC). In the electric mode, vehicle wheels may be propelled only via torque from an electric motor (e.g., electric machine 152 of FIG. 1) that is powered by a system energy storage device, such as a system battery (e.g., traction battery 158 of FIG. 1). As another example, an engine mode of operation may be selected when the torque demand is higher, when the fuel level in the fuel tank is higher, when fuel vapors stored in a vapor storage device (not shown) should be purged in the engine, and/or when the battery state of charge is lower. In the engine mode, the vehicle wheels may be propelled only via torque from an engine (e.g., engine 10 of FIG. 1). Further still, an assist mode may be selected if the torque demand is higher (e.g., higher than a second torque threshold, higher than the first) than can be provided via only engine torque. Therein, the vehicle wheels may be propelled via a combination of electric motor torque and engine torque.

At 206, it may be determined if the electric mode is selected. If the electric mode is selected, method 200 proceeds to 208 and includes propelling the vehicle using electric motor torque (such as by engaging a clutch to connect the electric machine to a transmission of the vehicle and components coupled thereto, as described with reference to FIG. 1). Thus, the engine is not used to generate torque for propelling the vehicle, and combustion does not occur. Instead, the electric motor may draw power from the system battery in order to propel the vehicle.

At 210, while operating in the electric mode, it may be determined if engine restart (herein also referred to as engine pull-up) conditions are met. In some examples, the engine restart conditions may include a restart request from the controller without input from the driver and without a change in vehicle state or ignition key state. For example, the engine restart conditions may be met if there is a change in operating conditions that warrants a transition to the engine mode (wherein the electric motor does not supply torque for propelling the vehicle) or the assist mode (wherein the vehicle is propelled primarily via engine torque and with the electric motor torque supplementing the engine torque). As one example, a transition to the engine mode may be requested if the battery SOC drops below the threshold SOC. The threshold SOC may be a positive, non-zero battery SOC level below which the battery may not be able to support or execute additional vehicle functions while propelling the vehicle via electric motor torque. As another example, a transition to the engine mode may be requested if the driver torque demand rises above the first torque threshold. The first torque threshold may be a positive, non-zero amount of torque that cannot be met or sustained by the electric motor, for example. As a further example, a transition to the assist mode may be requested if the driver torque demand rises above the second torque threshold. The second torque threshold may be a positive, non-zero amount of torque that is higher than the first torque threshold, corresponding to an amount of torque that cannot be met or sustained by the engine alone, for example.

If engine restart conditions are not met (e.g., the transition to the engine mode or the assist mode is not requested), method 200 proceeds to 212 and includes continuing to propel the vehicle using electric motor torque. As such, the engine will remain off (e.g., unfueled and at rest). Following 212, method 200 ends.

If instead engine restart conditions are met at 210, method 200 proceeds to 214 and includes pulling up (e.g., restarting) the engine. For example, pulling up the engine may include cranking the engine (e.g., via a starter motor), initiating fuel delivery to the cylinders, operating intake and exhaust valves of each cylinder to provide fresh air for combustion and to exhaust combusted gas, respectively, and initiating fuel combustion in the cylinders (e.g., by providing a spark via spark plugs). It will be appreciated that, during the engine pull-up event, the vehicle may continue to be propelled using electric motor torque. In particular, at 214, while pulling up the engine, electric motor torque output may be adjusted so that the combined torque of the electric motor and the engine achieves the driver-demanded torque as the engine is spun up. The method may then proceed to 216, as will be described below.

Returning to 206, if the electric mode is not selected, method 200 proceeds to 216 and includes propelling the vehicle using engine torque. Propelling the vehicle using engine torque may include operating in the engine mode (in which the vehicle is propelled via torque from the engine and not from the electric motor) or in the assist mode (in which the vehicle is propelled via torque from both the engine and the electric motor), but not in the electric mode. When the vehicle is propelled using engine torque, air and fuel are provided to cylinders of the engine, and an ignition event (such as a spark from a spark plug) initiates combustion. A reciprocating motion of a piston within the cylinder is translated into rotational motion of a crankshaft coupled to vehicle wheels, as described above with reference to FIG. 1.

At 218, method 200 includes supplying EGR responsive to engine demand, as described above with reference to FIG. 1. EGR may be requested at low to mid engine loads, for example, and after an emission control device has reached its light-off temperature. EGR may be supplied to an intake manifold of the engine, downstream of a throttle, via an EGR passage coupled between the intake manifold and an exhaust passage. The amount of EGR supplied may be varied by adjusting a degree of opening of the EGR valve disposed in the EGR passage responsive to a requested amount of EGR. As described above, the controller may determine the requested amount of EGR via a look-up table or through logic rules that directly take into account parameters such as engine load, engine speed, engine temperature, etc., and apply a signal corresponding to the degree of EGR valve opening for supplying the requested amount of EGR to the EGR valve, which may be further take into account pressure across the EGR valve (e.g., as measured by a manifold pressure sensor and an exhaust pressure sensor).

At 220, it is determined if a transition to the electric mode is requested. The transition to the electric mode may be requested if there is a change in operating conditions, such as if the driver torque demand is below the first torque threshold and/or if the battery SOC is sufficiently high to support the electric mode of operation (e.g., higher than the threshold SOC). If the transition to the electric mode is not requested (e.g., the driver torque demand is not below the first torque threshold and/or the battery SOC is not higher than the threshold SOC), method 200 proceeds to 222 and includes continuing to propel the vehicle using engine torque. Thus, the engine will remain on, with fuel delivered and combustion occurring in the cylinders, and the engine will not be pulled down. Following 222, method 200 ends.

If the transition to the electric mode is requested at 220, method 200 proceeds to 224 and includes pulling down the engine and propelling the vehicle using electric motor torque. In particular, during the engine pull-down event, the engine is spun, unfueled, to rest (e.g., zero speed). During the engine pull-down, cylinder combustion is discontinued, but intake and exhaust valves may remain active until the engine is at rest. As such, prior to the pull-down, the engine may be combusting fuel and spinning at an engine speed, and then during the pull down, combustion of fuel in the engine is discontinued and the engine is spun down to rest. The engine pull-down may include discontinuing fuel delivery to engine cylinders while propelling the vehicle using motor torque drawn from the electric motor, which is driven using power from the system battery. Additionally, the engine may be shut down and spun down to rest without receiving input from the vehicle operator and without a change in the vehicle state or the state of an ignition key.

At 226, method 200 includes closing a throttle and the EGR valve. While the engine is pulling down, combustion is not occurring, and so airflow and EGR need not be provided. The controller may send a signal that actuates the throttle (e.g., throttle 62 of FIG. 1) to a closed position to restrict a flow of intake air. Similarly, the controller may send a signal to a stepper motor of the EGR valve to move the EGR valve to a closed position to prevent exhaust gas from being recirculated. Whereas the closed position of the throttle may be confirmed using a throttle position sensor, the EGR valve may not include a position sensor, and thus, the closed position of the EGR valve may not be confirmed. It may be appreciated that, during engine pull-down, the closed position of the throttle may refer to a position that is open to a small degree, such that airflow to the engine is severely restricted. However, the closed position of the EGR valve may refer to a fully closed position.

At 228, method 200 includes measuring the intake pressure and the exhaust pressure. After the throttle is closed as the engine is pulled down, the intake pressure (e.g., the pressure of the intake manifold, downstream of the throttle) initially decreases as vacuum generated by the engine pulls air through the engine as it spins down, and the closed position of the throttle severely restricts airflow through the throttle. However, if the EGR valve is not fully closed, such as due to an obstruction preventing it from closing, the intake pressure may remain higher for a longer duration due to a flow of exhaust gas through the EGR valve replacing air as it is pulled through the engine. The intake pressure may be measured by the MAP sensor or estimated based on engine speed and load, as described above at 202. The exhaust pressure may be measured by a pressure sensor coupled to an exhaust passage, including the EGR passage (e.g., pressure sensor 144 of FIG. 1). Alternatively, the exhaust pressure may be estimated based on engine load and exhaust temperature. For example, the controller may input the engine load and exhaust temperature into a look-up table and output an estimated exhaust pressure corresponding to the input engine load and exhaust temperature. In one example, the intake pressure and the exhaust pressure may be continually measured throughout the engine pull-down event.

At 229, method 200 includes determining if entry conditions for checking EGR valve operation are met. For example, entry conditions for checking EGR valve operation may include no degradation of the EGR system, the MAP sensor, the throttle position sensor, a mass airflow (MAF) sensor, the exhaust pressure sensor, and a crankshaft position sensor currently indicated (e.g., logged at the controller). Entry conditions for checking EGR valve operation may further include the engine being warm, as EGR may not be supplied when the engine is not warm. Such entry conditions may prevent confounding factors, such as other sources of degradation, from influencing the results of the EGR valve operation check (e.g., by giving a false pass or a false fail). As an example, if the throttle position sensor is degraded, the closed position of the throttle may not be confirmed, and thus, a stuck open position of the EGR valve may not be confirmed, as described further below.

If entry conditions for checking EGR valve operation are not met, method 200 proceeds to 231 and includes spinning down the engine without checking EGR valve operation. Thus, if no other EGR system degradation is indicated, the engine may continue to be supplied with EGR responsive to engine demand after a subsequent engine restart. Following 231, method 200 ends.

If entry conditions for checking EGR valve operation are met at 229, method 200 proceeds to 230 and includes determining a ratio of the intake pressure to the exhaust pressure. In an alternative example, a difference between the intake pressure and the exhaust pressure is determined. Thus, whether the ratio or the difference is determined, a relation of the intake pressure and the exhaust pressure is determined during the engine pull-down event in order to check operation of the EGR valve. For example, determining the relation of the intake pressure and the exhaust pressure may commence after the vehicle transitions from being propelled by the engine to being propelled by the electric motor and may conclude when the engine is at rest (e.g., when the pull-down event is complete).

At 232, it is determined if the ratio does not reach or decrease below a threshold ratio while the engine is pulled down (e.g., after the throttle and the EGR valve are closed, and before the engine speed reaches zero and the engine is at rest). The threshold ratio may be a positive, non-zero value that corresponds to an expected amount of vacuum (e.g., decrease in pressure) that would generated in the intake manifold downstream of the throttle after the throttle and EGR valve are closed relative to the (higher) exhaust pressure. Thus, the threshold ratio may be a value less than one. In an alternative example, if the difference of the intake manifold pressure and the exhaust manifold pressure is determined instead of the ratio, at 232, it is determined if the difference does not reach or exceed a threshold difference while the engine is pulled down. Similar to the threshold ratio, the threshold difference may be a positive, non-zero value that corresponds to the expected amount of vacuum that would generated in the intake manifold downstream of the throttle after the throttle and EGR valve are closed relative to the (higher) exhaust pressure. In one example, the threshold ratio (or threshold difference) is predetermined based on experimental testing of a fully closed EGR valve versus EGR valves with a range of partially closed positions and stored in a memory of the controller. In some examples, the threshold ratio (or difference) may be further adjusted based on barometric (atmospheric) pressure, with the controller inputting the barometric pressure a look-up table or algorithm and outputting the threshold ratio (or threshold difference) for the corresponding input barometric pressure. Thus, both the threshold ratio and the threshold difference may vary based on the barometric pressure at the time of engine shutdown.

If the ratio does not reach or decrease below the threshold ratio (or the difference does not reach or exceed the threshold difference) before the pull-down event is complete, a first intake pressure and exhaust pressure relation is present, and method 200 proceeds to 234. At 234, in response to the first intake pressure and exhaust pressure relation being present, method 200 includes indicating EGR system degradation due to a stuck open EGR valve. That is, with the throttle confirmed to be in a closed position (via the throttle position sensor), the intake pressure remained higher due to the stuck open EGR valve allowing exhaust gas to be supplied to the intake manifold. Indicating EGR system degradation may include setting a diagnostic trouble code (DTC) corresponding to EGR system degradation being present, and may further include indicating EGR valve degradation and a corresponding DTC. Additionally, a malfunction indicator lamp (MIL) may be illuminated to alert the vehicle operator of the degradation. Further still, indicating EGR system degradation may include disabling the EGR system, as the degraded EGR valve may not be accurately controlled to provide a desired EGR dilution. However, disabling the EGR system may not prevent undesired EGR from flowing through the degraded, stuck open EGR valve, as described further below.

At 236, method 200 includes adjusting engine operating parameters at a subsequent engine restart, as will be described with reference to FIG. 3 below. In particular, with the EGR valve stuck open, recirculated exhaust gas may be delivered during conditions when EGR is not favorable (e.g., during engine start). Thus, an engine starting speed, ignition timing, fueling, and/or boost pressure may be adjusted. Additionally, the engine operating parameters may continue to be adjusted following the subsequent engine restart while the EGR valve remains degraded (e.g., the one or more DTCs have not been cleared). Following 236, method 200 ends.

Returning to 232, if the ratio is less than or equal to the threshold ratio (or the difference is greater than or equal to the threshold difference), a second intake pressure and exhaust pressure relation is present, and method 200 proceeds to 238. At 238, in response to the second intake pressure and exhaust pressure relation being present, method 200 includes not indicating EGR system degradation. Thus, the engine may continue to be supplied with EGR responsive to engine demand after a subsequent engine restart. Further, the engine operating parameters may not be adjusted. Following 238, method 200 ends.

Figure 3:
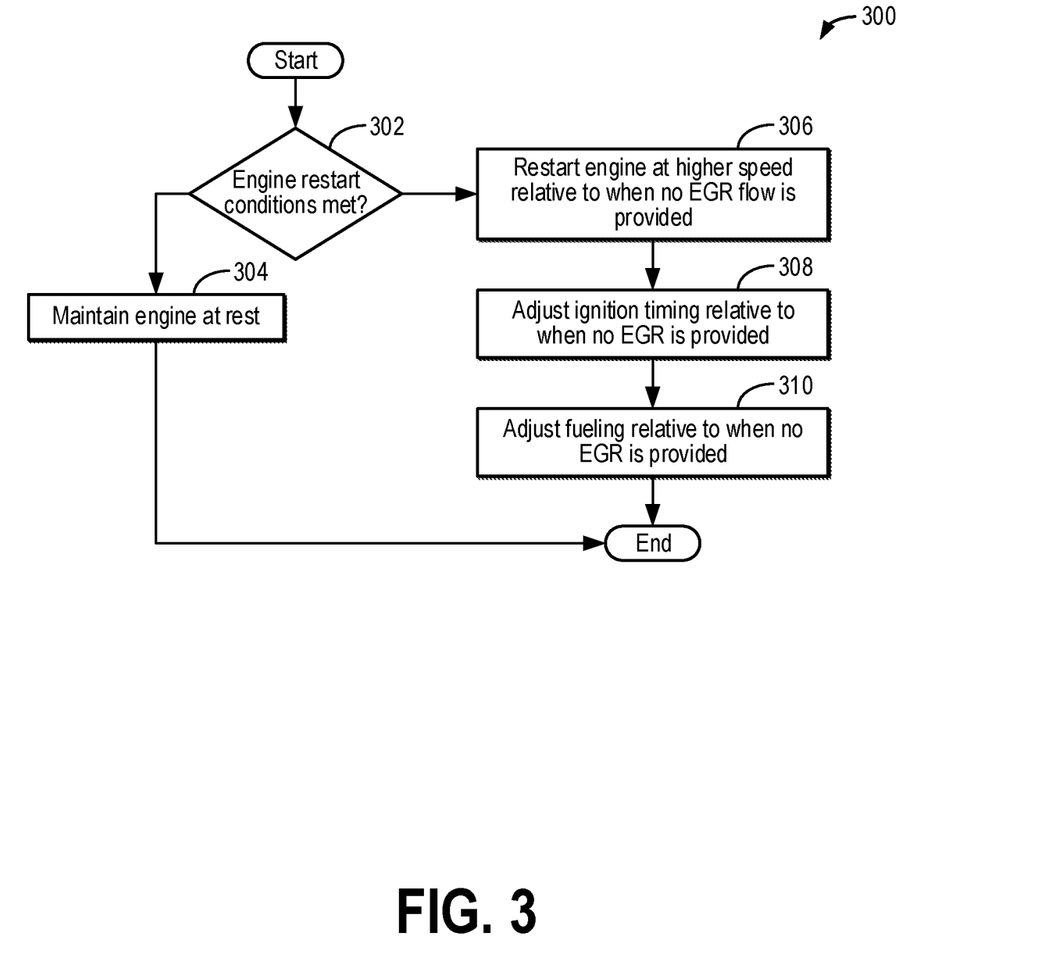
FIG. 3 is a flow chart of an example method adjusting engine operating parameters in response to the EGR valve being indicated as stuck open.
Figure 4:
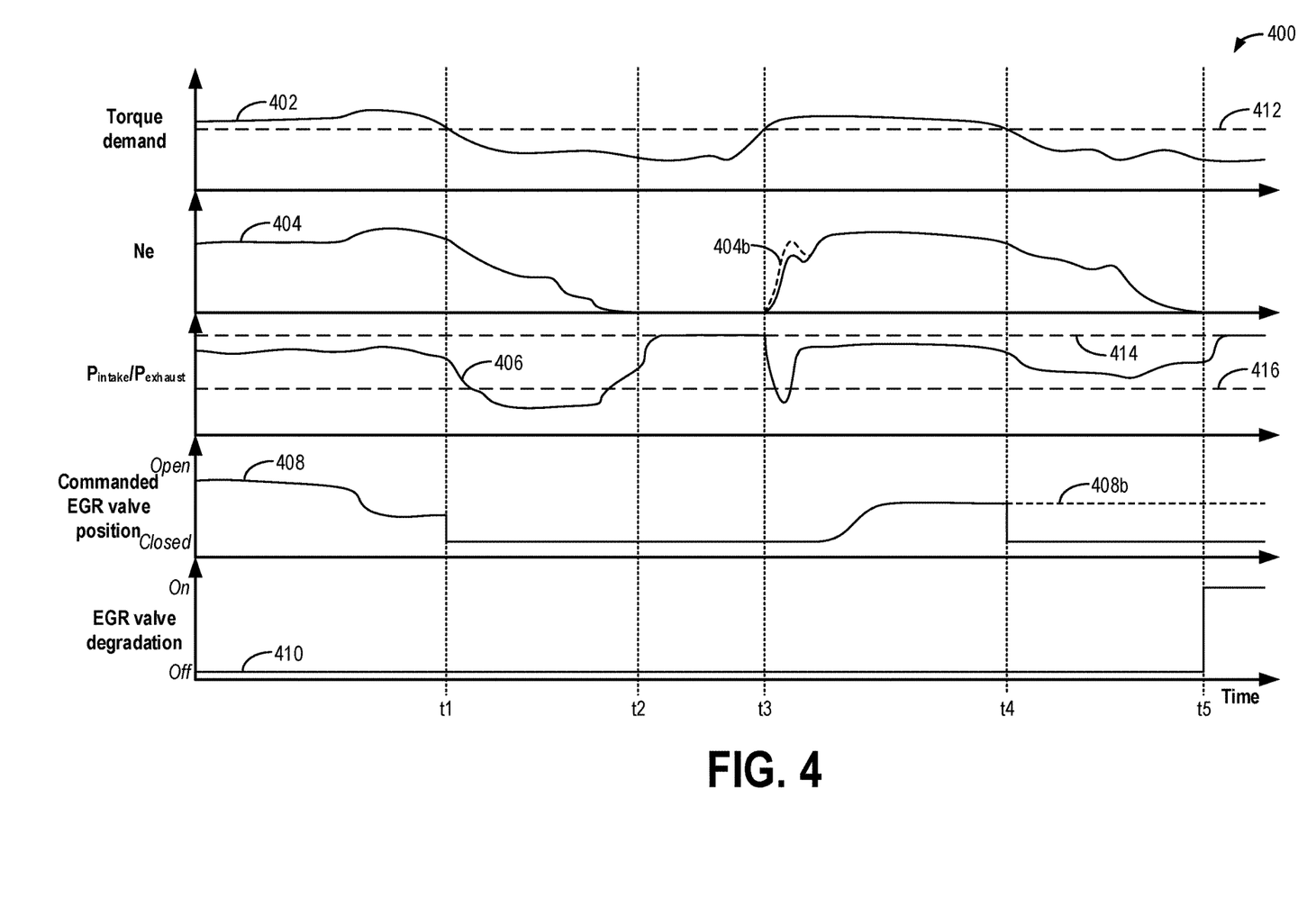
FIG. 4 shows an example graph of diagnosing the EGR valve during vehicle operation.

Continuing to FIG. 3, an example method 300 describing adjustments to the engine operating parameters during and after a subsequent engine restart is shown. Method 300 may be performed as a part of method 200 of FIG. 2, for example (e.g., at 236), in response to the first intake pressure and exhaust pressure relation being present and EGR valve degradation being indicated, as described above.

Method 300 begins at 302 and includes determining if engine restart conditions are met. In one example, if the vehicle is being operated in the electric mode, engine restart conditions may include a restart request from the controller without input from the driver and without a change in vehicle state or ignition key state, as described above at 206. In another example, the engine restart may be requested by the driver and responsive to a change in the ignition key state, such as when the vehicle is off and the driver changes the ignition key from a "key-off" position to a "key-on" position. As such, the vehicle may have continued to be driven in the electric mode prior to the engine restart request or may have been turned off, at rest, prior to the engine restart request.

If engine restart conditions are not met (e.g., an engine restart is not requested by the controller or the driver), method 300 proceeds to 304 and includes maintaining the engine at rest. Thus, the engine will not be cranked, and combustion will not occur in cylinders of the engine. Following 304, method 300 ends.

If engine restart conditions are met at 302, method 300 proceeds to 306 and includes restarting the engine at a higher speed relative to when no EGR flow is provided (e.g., undesired EGR is not present). For example, during the subsequent engine restart and all other engine starts while the EGR valve remains degraded, the engine may be cranked to a higher speed (such as via a starter motor) before combustion is resumed. For example, undesired EGR may be provided through the degraded, stuck open EGR valve, which may decrease in-cylinder temperatures and dilute charge air within engine cylinders. As a result, an increased occurrence of misfire and engine stalling may occur. By cranking the engine to a higher starting speed, the increased inertia of the engine may help prevent stalling. Further, an idle speed of the engine may be set to a higher speed than when no undesired EGR is provided, particularly when the engine is included in a stop/start vehicle.

At 308, method 300 includes adjusting ignition timing relative to when no EGR is provided. For example, the undesired EGR may reduce in-cylinder temperatures and slow combustion, which may lead to misfire or partial burns. Thus, ignition timing may be advanced relative to a base timing for given engine operating conditions in order to compensate for the undesired EGR and increase the in-cylinder temperature, thereby decreasing the occurrence of misfire or partial burns. For example, the controller may refer a look-up table with engine operating conditions (e.g., engine speed and load, engine coolant temperature, MAP, and air temperature) as the input and output the base ignition timing. The controller may then advance the ignition timing relative to the base ignition timing by a pre-determined number of crank angle degrees. A signal SA sent to an ignition system (e.g., ignition system 88 of FIG. 1) at the determined advanced ignition timing may trigger firing of a spark plug (e.g., spark plug 92 of FIG. 1) to provide ignition at the determined advanced ignition timing, for example.

At 310, method 300 includes adjusting fueling relative to when no EGR is provided. For example, the undesired EGR may dilute the cylinder air charge, which may cause the engine to run rich. Therefore, a fuel injection amount may be decreased relative to a base fuel injection amount delivered when no undesired EGR is provided in order to achieve a desired air/fuel ratio (AFR). For example, the controller may calculate the base fuel injection amount by dividing the cylinder air amount by the desired AFR. The controller may then decrease the fuel injection amount by a pre-determined amount. The controller may then generate a signal with a pulse width corresponding to the decreased fuel injection amount to send to fuel injectors of the engine (e.g., fuel injector 66 of FIG. 1). Further, the fuel injection amount may be adjusted based on feedback from an exhaust gas oxygen sensor, such as UEGO sensor 128 of FIG. 1, in order to achieve the desired AFR. In one example, the desired AFR is stoichiometry. Following 310, method 300 ends.

Together, method 200 of FIG. 2 and method 300 of FIG. 3 provide a method for determining whether an EGR valve in a vehicle is degraded and stuck open while an engine of the vehicle is pulled down as the vehicle is transitioned from an engine mode (or an assist mode) to an electric mode. Transitioning from the engine mode (or the assist mode), in which an engine supplies torque for propelling the vehicle, to the electric mode, in which an electric motor supplies torque for propelling the vehicle and the engine does not supply torque for propelling the vehicle, may include closing a throttle and closing the EGR valve. In one example, the method may include differentiating between a first intake pressure and exhaust pressure relation and a second intake pressure and exhaust pressure relation while the engine is pulled down. In response to the first intake pressure and exhaust pressure relation, the method may include indicating EGR valve degradation and adjusting engine operating parameters for undesired EGR, and in response to the second intake pressure and exhaust pressure relation (which may be when the first intake pressure and exhaust pressure relation is not present), the method may include not indicating EGR valve degradation and not adjusting engine operating parameters for undesired EGR. In some examples, indicating EGR valve degradation and adjusting engine operating parameters occurs while or during the first intake and exhaust pressure relation and while the second intake pressure and exhaust pressure relation is not present. The first intake pressure and exhaust pressure relation may include either a ratio of the intake pressure to the exhaust pressure not reaching or decreasing below a threshold ratio during the engine pull-down or a difference between the intake pressure and the exhaust pressure not reaching or exceeding a threshold difference during the engine pull-down. The second intake pressure and exhaust pressure relation may include either the ratio of the intake pressure to the exhaust pressure reaching or decreasing below the threshold ratio during the engine pull-down or the difference between the intake pressure and the exhaust pressure reaching or exceeding the threshold difference during the engine pull-down. Thus, during an engine pull-down event, either the first intake pressure and exhaust pressure relation or the second intake pressure and exhaust pressure relation is necessarily present.

Further, instructions stored in memory may include instructions for differentiating between the first intake pressure and exhaust pressure relation and the second intake pressure and exhaust pressure relation from output of a MAP sensor (e.g., MAP sensor 122 of FIG. 1) and from output of a pressure sensor disposed in an exhaust passage upstream of the EGR valve (e.g., pressure sensor 144 of FIG. 1). In response to determining the first intake pressure and exhaust pressure relation, indicating EGR valve degradation may be performed by instructions for setting a corresponding diagnostic trouble code. Further, in response to determining the first intake pressure and exhaust pressure relation, adjusting engine operating parameters for undesired EGR may be performed by instructions for sending a signal SA to an ignition system (e.g., ignition system 88 of FIG. 1) at an advanced timing relative to a base timing determined based on engine operating conditions when undesired EGR is not present. Additionally or alternatively, adjusting engine operating parameters may be performed by instructions for sending a signal FPW to a fuel injector (e.g., fuel injector 66 of FIG. 1) with a decreased pulse width relative to a base pulse width determined based on engine operating conditions when undesired EGR is not present. Additionally or alternatively, adjusting engine operating parameters may be performed by instructions for sending a signal to an electric starter motor to crank the engine to a higher speed than when undesired EGR is not present. Further, the instructions stored in memory may include instructions for setting an engine idle speed to a higher speed in response to determining the first intake pressure and exhaust pressure relation. In some examples, the method may include determining whether to perform one or more of each of advancing ignition timing, decreasing fueling, cranking the engine to a higher speed, and setting a higher engine idle speed based on a determination of whether the first intake pressure and exhaust pressure relation is present and a determining of whether the second intake pressure and exhaust pressure relation is not present.

Turning now to FIG. 4, an example graph 400 of checking operation of EGR valve during operation of a hybrid vehicle, such as vehicle 5 of FIG. 1, is shown. Vehicle torque demand is shown in plot 402, engine speed (Ne) is shown in plot 404, a ratio of intake pressure to exhaust pressure is shown in plot 406, (commanded) EGR valve position is shown in plot 408, and an indication of EGR valve degradation is shown in plot 410. Additionally, a threshold torque demand for transitioning between an engine mode of operation and an electric mode of operation is indicated by dashed line 412, an intake pressure to exhaust pressure ratio of one (e.g., when the intake pressure and the exhaust pressure are equal) is indicated by dashed line 414, and an intake pressure to exhaust pressure threshold ratio for indicating EGR valve degradation is indicated by dashed line 416. In the example of FIG. 4, the threshold ratio is illustrated as a straight line. However, it should be understood that the threshold ratio may vary based on barometric pressure, as described with reference to FIG. 2. For all of the above, the X-axis represents time, with time increasing along the X-axis from left to right. The Y-axis indicates each labeled parameter, with values increasing from bottom to top, except for plot 408, in which the EGR valve position ranges from "closed" (fully closed) to "open" (fully open), and plot 410, in which the indication of EGR valve degradation is "off" (no degradation is indicated) or "on" (degradation is indicated).

Prior to time t1, the vehicle is operated with a torque demand (plot 402) that is greater than the threshold torque demand (dashed line 412), which may correspond to the first threshold torque demand of method 200 of FIG. 2. With the vehicle torque demand greater than the threshold torque demand, the vehicle is operated in the engine mode, with an engine (e.g., engine 10 shown in FIG. 1) providing torque to propel the vehicle, as described above with reference to FIG. 2. As a result of operating in the engine mode, the engine is operated at a positive, non-zero speed (plot 404) in order to supply the demanded torque. Further, EGR is provided responsive to engine demand, with the EGR valve (e.g., EGR valve 142 of FIG. 1) positioned by a stepper motor, for example, to provide a desired amount of exhaust gas to an intake manifold of the engine. The intake pressure (e.g., a pressure of the intake manifold, such as measured by MAP sensor 122 of FIG. 1) to exhaust pressure (e.g., a pressure of an exhaust passage, such as measured by pressure sensor 144 of FIG. 1) ratio is relatively high but less than one (dashed line 414) due to the engine operating with natural aspiration (e.g., the intake pressure is less than the exhaust pressure), as shown in plot 408. Further, EGR valve degradation is not indicated (plot 410).

At time t1, the vehicle torque demand (plot 402) decreases below the threshold torque demand (dashed line 412), enabling a transition to the electric mode of operation. During the electric mode of operation, the vehicle is propelled by torque from an electric machine (e.g., electric machine 152 of FIG. 1) and not by torque from the engine. In response to the transition to the electric mode of operation, a throttle (not shown) and the EGR valve (plot 408) are commanded closed, and the engine is pulled down. As the engine is pulled down, combustion does not occur (e.g., fuel and spark are not provided), and the speed of the engine decreases (plot 404) until it comes to a rest at time t2. Between time t1 and time t2, the intake pressure initially decreases due to the throttle and the EGR valve closing, resulting in the ratio of intake pressure to exhaust pressure decreasing. While the engine pulls down and before it comes to a rest at time t2, the ratio of the intake pressure to the exhaust pressure (plot 406) reaches and decreases below the threshold ratio (dashed line 416), indicating that a sufficient vacuum has formed in the intake to determine that the EGR valve is fully closed, as commanded. And EGR valve degradation is not indicated (plot 410). Although the ratio of the intake pressure to the exhaust pressure increases above the threshold ratio again before the engine pull-down is complete at time t2, because the ratio of the intake pressure to the exhaust pressure decreased below the threshold ratio during the pull-down, the indication of EGR valve degradation remains off (plot 410). The ratio of the ratio of the intake pressure to the exhaust pressure may increase as the intake pressure and the exhaust pressure move toward equilibrium (dashed line 414) as the engine speed (plot 404) slows, for example.

Between time t2 and t3, the engine is at rest (plot 404), and the intake pressure and the exhaust pressure reach equilibrium (e.g., the ratio of the intake pressure to the exhaust pressure reaches one, as shown in plot 406). The vehicle is operated in the electric mode and propelled by the electric motor. However, at time t3, the torque demand (plot 402) reaches the threshold torque demand (dashed line 412). As a result, the vehicle is transitioned back to the engine mode of operation, and the engine is pulled up. Pulling up the engine includes cranking the engine before fuel and spark are provided and combustion begins. The throttle valve is also opened. If the EGR valve had been determined to be degraded between time t1 and t2, the engine may be cranked to a higher starting speed, for example, as illustrated by dashed segment 404b. However, since the EGR valve was not determined to be degraded, the engine starting speed is not increased. While the engine is pulled up, the intake pressure initially decreases as intake air is pulled through the rotating engine, resulting in the ratio of the intake pressure to the exhaust pressure decreasing. However, the EGR valve is not diagnosed during the engine pull-up. After the engine is started and combustion is occurring, EGR may be supplied responsive to engine demand, and so the stepper motor adjusts the position of the EGR valve (plot 408) responsive to the engine demand.

At time t4, the torque demand (plot 402) decreases below the threshold torque demand (dashed line 412), and thus, the vehicle is again transitioned to operating in the electric mode. Thus, at time t4, the throttle and the EGR valve (plot 408) are commanded closed, fuel and spark are not provided to the engine, and the engine is pulled down. The ratio of the intake pressure to the exhaust pressure (plot 406) initially decreases after the throttle is closed at time t4. However, the ratio of the intake pressure to the exhaust pressure does not reach or decrease below the threshold ratio (dashed line 416) during the engine pull down and before the engine comes to a rest at time t5. For example, the EGR valve may be stuck in an open position, such as indicated by dashed segment 408b, due to an obstruction preventing the valve from closing. Therefore, sufficient vacuum is not achieved in the intake manifold to confirm that the EGR valve has closed, and EGR valve degradation is indicated at time t5 (plot 410). During a subsequent engine restart, the engine may be cranked to a higher starting speed, such as indicated by dashed segment 404b. Additionally or alternatively, ignition timing, fueling, and/or boost may be adjusted to compensate for undesired EGR while the EGR valve remains degraded (e.g., the indication of EGR valve degradation remains on), as described above with reference to FIG. 3.

Note that while in the example of FIG. 4, torque demand is used to initiate the transition between the engine mode of operation and the electric mode of operation. However, in other examples, other conditions may be used, such as those described with reference to FIG. 2, including a state of charge of a battery powering the electric motor relative to a threshold state of charge and a fuel level of a fuel tank relative to a threshold fuel level.

In this way, a degraded EGR valve that is stuck open may be opportunistically identified in a hybrid or a stop/start vehicle while the engine is pulled down and the vehicle remains in motion. In particular, no adjustments to a position of the EGR valve are made after the EGR valve and a throttle of the engine are commanded closed in response to the pull down. Instead, the pull down provides an opportunity for determining if the EGR valve is not fully closed, as commanded, based on an expected intake pressure decrease during the pull down and a known closed position of the throttle. By comparing the intake pressure to an exhaust pressure, an intake pressure decrease that is less than expected may be identified, such as when a ratio of the intake pressure to the exhaust pressure does not reach or decrease below a threshold ratio or a difference between the intake pressure and the exhaust pressure does not reach or exceed a threshold difference. In response to the ratio or the difference identifying an intake pressure decrease that is less than expected, degradation of the EGR system and the EGR valve may be indicated. Further, in response to the indication, engine operating parameters, such as engine starting speed, ignition timing, fueling, and boost amount, may be adjusted upon a subsequent engine start. Thus, degradation of engine performance, such as due to rough idle, partial burns, and misfire, may be prevented.

The technical effect of comparing an intake pressure of an engine to an exhaust pressure of an engine during an engine pull-down event is that an EGR valve that is degraded and stuck open may be identified.

As one example, a method is provided, comprising: propelling a vehicle by an engine having a throttle coupled to an intake manifold; recirculating a portion of engine exhaust to the intake manifold through an exhaust gas recirculation (EGR) valve; and checking operation of the EGR valve, based on both intake manifold pressure and exhaust pressure, after closing the throttle and the EGR valve when propelling the vehicle with an electric motor while the engine spins down to rest. In the preceding example, additionally or alternatively, the checking operation of the EGR valve commences after the vehicle transitions from being propelled by the engine to being propelled by the electric motor and concludes when the engine is at rest. In any or all of the preceding examples, the method additionally or alternatively further comprises shutting off fuel supplied to the engine during the checking operation of the EGR valve. In any or all of the preceding examples, additionally or alternatively, the EGR valve is not coupled to a position sensor. In any or all of the preceding examples, additionally or alternatively, the EGR valve is positioned by a stepper motor. In any or all of the preceding examples, additionally or alternatively, the checking operation of the EGR valve includes one or more of determining a difference between the intake manifold pressure and the exhaust pressure and determining a ratio of the intake manifold pressure to the exhaust pressure. In any or all of the preceding examples, the method additionally or alternatively further comprises, in response to one or more of the difference between the intake manifold pressure and the exhaust pressure not reaching or exceeding a threshold difference and the ratio of the intake manifold pressure to the exhaust pressure not reaching or going below a threshold ratio, indicating degradation of the EGR valve and adjusting operating parameters of the engine. In any or all of the preceding examples, additionally or alternatively, the adjusting operating parameters of the engine includes advancing ignition timing of the engine relative to when no exhaust gas is recirculated to the intake manifold. In any or all of the preceding examples, additionally or alternatively, the adjusting operating parameters of the engine includes decreasing an amount of fuel supplied to the engine relative to when no exhaust gas is recirculated to the intake manifold. In any or all of the preceding examples, additionally or alternatively, the intake manifold pressure is based on one or more of the following: an output from a pressure sensor coupled to the intake manifold; or, an output from an algorithm based on engine speed and load.

As another example, a method is provided, comprising: propelling a hybrid vehicle with an engine having a throttle coupled to an intake manifold, and recirculating a portion of engine exhaust to the intake manifold through an EGR valve; transitioning from propelling the hybrid vehicle with the engine to propelling the hybrid vehicle with an electric motor, in part by closing the throttle, closing the EGR valve, and shutting off engine fuel delivery; determining whether the EGR valve does not fully close based on either a difference or a ratio of intake manifold pressure to exhaust pressure; and adjusting operating parameters of the engine in response to the EGR valve not fully closing. In the preceding example, additionally or alternatively, the adjusting engine operating parameters includes advancing ignition timing of the engine and decreasing fuel delivered to the engine relative to when the EGR valve is fully closed after a subsequent engine restart. In any or all of the preceding examples, additionally or alternatively, the adjusting engine operating parameters includes cranking the engine to a higher speed than when the EGR valve is fully closed during a subsequent engine restart. In any or all of the preceding examples, the method additionally or alternatively further comprises disabling the recirculation of exhaust gases in response to the determining the EGR valve does not fully close. In any or all of the preceding examples, additionally or alternatively, the determining whether the EGR valve does not fully close based on either the difference or the ratio of intake manifold pressure to exhaust pressure includes indicating that the EGR valve does not fully close in response to either the difference not reaching or exceeding a threshold difference or the ratio not reaching or decreasing below a threshold ratio, and indicating that the EGR valve fully closes in response to either the difference being greater than or equal the threshold difference or the ratio being less than or equal to the threshold ratio.

As a further example, a system for a vehicle is provided, comprising: an engine, including an intake manifold and an exhaust passage; a fuel tank; an electric motor; a traction battery; an EGR system, including an EGR passage coupled between the intake manifold and the exhaust passage with an EGR valve coupled therein; a throttle positioned in an intake of the engine, upstream of where the EGR system couples to the intake manifold; a manifold absolute pressure sensor coupled to the intake manifold; a pressure sensor coupled to the EGR passage upstream of the EGR valve; and a controller with computer readable instructions for: propelling the vehicle with the engine while operating in an engine mode or an assist mode; providing exhaust gas to the intake manifold responsive to engine demand while operating in the engine mode or the assist mode; shutting off fuel delivery from the fuel tank to the engine, closing the throttle and the EGR valve, and spinning the engine down to rest while propelling the vehicle with the electric motor in response to a request for transitioning to an electric mode; measuring the intake pressure with the manifold absolute pressure sensor and the exhaust pressure with the pressure sensor coupled to the EGR passage following the closing the throttle and the EGR valve; in response to a first intake pressure and exhaust pressure relation, indicating degradation of the EGR valve; and in response to a second intake pressure and exhaust pressure relation, not indicating degradation of the EGR system. In the preceding example, additionally or alternatively, the request for transitioning to the electric mode is responsive to one or more of a torque demand being below a torque threshold, a fuel level in the fuel tank being less than a fuel level threshold, and a state of charge of the traction battery being higher than a threshold state of charge, and indicating degradation of the EGR system further includes indicating degradation of the EGR valve and disabling the EGR system. In any or all of the preceding examples, additionally or alternatively, the first intake pressure and exhaust pressure relation includes a ratio of the intake pressure and the exhaust pressure not reaching or decreasing below a threshold ratio, and the second intake pressure and exhaust pressure relation includes the ratio of the intake pressure and the exhaust pressure reaching or decreasing below the threshold ratio. In any or all of the preceding examples, additionally or alternatively, the first intake pressure and exhaust pressure relation includes a difference between the intake pressure and the exhaust pressure not reaching or exceeding a threshold difference, and the second intake pressure and exhaust pressure relation includes the difference of the intake pressure and the exhaust pressure reaching or exceeding the threshold difference. In any or all of the preceding examples, additionally or alternatively, the controller includes further computer readable instructions for: during a subsequent engine restart, cranking the engine to a higher speed in response to the first intake pressure and exhaust pressure relation than in response to the second intake pressure and exhaust pressure relation; and after the subsequent engine restart, providing ignition at a more advanced timing and fuel at a decreased amount in response to the first intake pressure and exhaust pressure relation than in response to the second intake pressure and exhaust pressure relation.

In another representation, a method includes, in response to an engine pull-down where the engine is shut down and a vehicle housing the engine is propelled via an electric motor: closing a throttle and an EGR valve; and indicating degradation of the EGR valve in response to a difference in pressure between an intake manifold and an exhaust passage remaining below a threshold difference until the engine reaches a state of rest. As an example, the method may additionally or alternatively further include indicating degradation of the EGR valve in response to a ratio of pressure in the intake manifold and pressure in the exhaust passage remaining above a threshold ratio until the engine reaches the state of rest.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
executing computer readable instructions on a controller to perform the steps of:
propelling a vehicle by an engine having a throttle coupled to an intake manifold;
recirculating a portion of engine exhaust to the intake manifold through an exhaust gas recirculation (EGR) valve;
closing the throttle and commanding closing of the EGR valve when propelling the vehicle with an electric motor while the engine spins down to rest;
checking operation of the EGR valve by measuring an intake pressure with a manifold absolute pressure sensor and an exhaust pressure with a pressure sensor coupled to an EGR passage upstream of the EGR valve; and
in response to a first intake pressure and exhaust pressure relation, indicating EGR valve degradation as stuck open based on both the intake pressure and the exhaust pressure after the commanding;
wherein the first intake pressure and exhaust pressure relation includes a ratio of the intake pressure to the exhaust pressure not reaching or decreasing below a threshold ratio.

2. The method of claim 1, wherein the checking operation of the EGR valve commences after the vehicle transitions from being propelled by the engine to being propelled by the electric motor and concludes when the engine is at rest.

3. The method of claim 2, further comprising shutting off fuel supplied to the engine during the checking operation of the EGR valve.

4. The method of claim 1, wherein the EGR valve is not coupled to a position sensor.

5. The method of claim 1, wherein the EGR valve is positioned by a stepper motor.

6. The method of claim 1, wherein the checking operation of the EGR valve includes one or more of determining a difference between the intake manifold pressure and the exhaust pressure and determining a ratio of the intake manifold pressure to the exhaust pressure.

7. The method of claim 6, further comprising:
in response to one or more of the difference between the intake manifold pressure and the exhaust pressure not reaching or exceeding a threshold difference and the ratio of the intake manifold pressure to the exhaust pressure not reaching or going below a threshold ratio, indicating degradation of the EGR valve and adjusting operating parameters of the engine.

8. The method of claim 7, wherein the adjusting operating parameters of the engine includes advancing ignition timing of the engine relative to when no exhaust gas is recirculated to the intake manifold.

9. The method of claim 7, wherein the adjusting operating parameters of the engine includes decreasing an amount of fuel supplied to the engine relative to when no exhaust gas is recirculated to the intake manifold.

10. The method of claim 1, wherein the intake manifold pressure is based on one or more of the following: an output from a pressure sensor coupled to the intake manifold, or an output from an algorithm based on engine speed and load.

11. A method, comprising:
executing computer readable instructions on a controller to perform the steps of:
propelling a hybrid vehicle with an engine having a throttle coupled to an intake manifold, and recirculating a portion of engine exhaust to the intake manifold through an exhaust gas recirculation (EGR) valve;
transitioning from propelling the hybrid vehicle with the engine to propelling the hybrid vehicle with an electric motor, in part by closing the throttle, commanding closing of the EGR valve, and shutting off engine fuel delivery;
determining whether the EGR valve does not fully close based on either a difference or a ratio of intake manifold pressure to exhaust pressure, wherein determining whether the EGR valve does not fully close based on either the difference or the ratio of the intake manifold pressure to the exhaust pressure includes indicating that the EGR valve does not fully close in response to either the difference not reaching or exceeding a threshold difference or the ratio not reaching or decreasing below a threshold ratio, and indicating that the EGR valve fully closes in response to either the difference being greater than or equal to the threshold difference or the ratio being less than or equal to the threshold ratio, wherein one of the threshold difference or the threshold ratio is based on barometric pressure; and
adjusting operating parameters of the engine in response to the EGR valve not fully closing.

12. The method of claim 11, wherein the adjusting engine operating parameters includes advancing ignition timing of the engine and decreasing fuel delivered to the engine relative to when the EGR valve is fully closed after a subsequent engine restart.

13. The method of claim 11, wherein the adjusting engine operating parameters includes cranking the engine to a higher speed than when the EGR valve is fully closed during a subsequent engine restart.

14. The method of claim 11, further comprising disabling the recirculation of engine exhaust in response to the determining the EGR valve does not fully close.

15. A system for a vehicle, comprising:
an engine, including an intake manifold and an exhaust passage;
a fuel tank;
an electric motor;
a traction battery;
an exhaust gas recirculation (EGR) system, including an EGR passage coupled between the intake manifold and the exhaust passage with an EGR valve coupled therein;
a throttle positioned in an intake of the engine, upstream of where the EGR system couples to the intake manifold;
a manifold absolute pressure sensor coupled to the intake manifold;
a pressure sensor coupled to the EGR passage upstream of the EGR valve; and
a controller with computer readable instructions for:
propelling the vehicle with the engine while operating in an engine mode or an assist mode;
providing exhaust gas to the intake manifold responsive to engine demand while operating in the engine mode or the assist mode;
shutting off fuel delivery from the fuel tank to the engine, closing the throttle and the EGR valve, and spinning the engine down to rest while propelling the vehicle with the electric motor in response to a request for transitioning to an electric mode;
measuring an intake pressure with the manifold absolute pressure sensor and an exhaust pressure with the pressure sensor coupled to the EGR passage following the closing the throttle and the EGR valve;
in response to a first intake pressure and exhaust pressure relation, indicating degradation of the EGR valve; and
in response to a second intake pressure and exhaust pressure relation, not indicating degradation of the EGR valve;
wherein the request for transitioning to the electric mode is responsive to one or more of a torque demand being below a torque threshold, a fuel level in the fuel tank being less than a fuel level threshold, and a state of charge of the traction battery being higher than a threshold state of charge, and wherein indicating degradation of the EGR system further includes indicating degradation of the EGR valve and disabling the EGR system.

16. The system of claim 15, wherein the first intake pressure and exhaust pressure relation includes a ratio of the intake pressure to the exhaust pressure not reaching or decreasing below a threshold ratio, and the second intake pressure and exhaust pressure relation includes the ratio of the intake pressure to the exhaust pressure reaching or decreasing below the threshold ratio.

17. The system of claim 15, wherein the first intake pressure and exhaust pressure relation includes a difference between the intake pressure and the exhaust pressure not reaching or exceeding a threshold difference, and the second intake pressure and exhaust pressure relation includes the difference of the intake pressure and the exhaust pressure reaching or exceeding the threshold difference.

18. The system of claim 15, wherein the controller includes further computer readable instructions for:

during a subsequent engine restart, cranking the engine to a higher speed in response to the first intake pressure and exhaust pressure relation than in response to the second intake pressure and exhaust pressure relation; and after the subsequent engine restart, providing ignition at a more advanced timing and fuel at a decreased amount in response to the first intake pressure and exhaust pressure relation than in response to the second intake pressure and exhaust pressure relation.

* * * * *